United States Patent [19]

Dunn et al.

[11] 4,104,355

[45] Aug. 1, 1978

[54] VITREOUS FIBER DRAWING PROCESS

[75] Inventors: Stanley A. Dunn; Elmer G. Paquette, both of Madison, Wis.

[73] Assignee: Bjorksten Research Laboratories, Inc., Madison, Wis.

[21] Appl. No.: 682,444

[22] Filed: May 3, 1976

[51] Int. Cl.² .............................................. B29C 17/02
[52] U.S. Cl. ........................ 264/290 R; 264/DIG. 19
[58] Field of Search .............. 65/DIG. 7; 264/63, 65, 264/DIG. 19, 290 R, 210 F; 164/82, 174

[56] References Cited

U.S. PATENT DOCUMENTS

| | | | |
|---|---|---|---|
| 2,968,622 | 1/1961 | Whitehaust .................... | 264/210 F |
| 3,504,730 | 4/1970 | Dannohl ........................ | 264/171 |
| 3,540,870 | 11/1970 | Li ................................ | 264/210 F |
| 3,666,348 | 5/1972 | Marctili ........................ | 65/DIG. 7 |
| 3,679,384 | 7/1972 | Colson et al. ................. | 65/DIG. 7 |
| 3,690,853 | 9/1972 | Law .............................. | 65/DIG. 7 |
| 3,912,478 | 10/1975 | Presbg ......................... | 264/210 F |

Primary Examiner—Jay H. Woo
Attorney, Agent, or Firm—John M. Diehl; Johan Bjorksten

[57] ABSTRACT

Fibers composed of mixtures of refractory metal oxides, other than silica, are treated by a process involving a drawing step to markedly increase the modulus of elasticity of the fibers. The compositions of the fibers to which the process is applied are typically mixtures of refractory vitreous metal oxides such as calcia, alumina, verylia and the like which are devoid or nearly devoid of silica or other network formers but may be a single such oxide mixed with no more than small or insignificant amounts of such other oxides.

6 Claims, 1 Drawing Figure

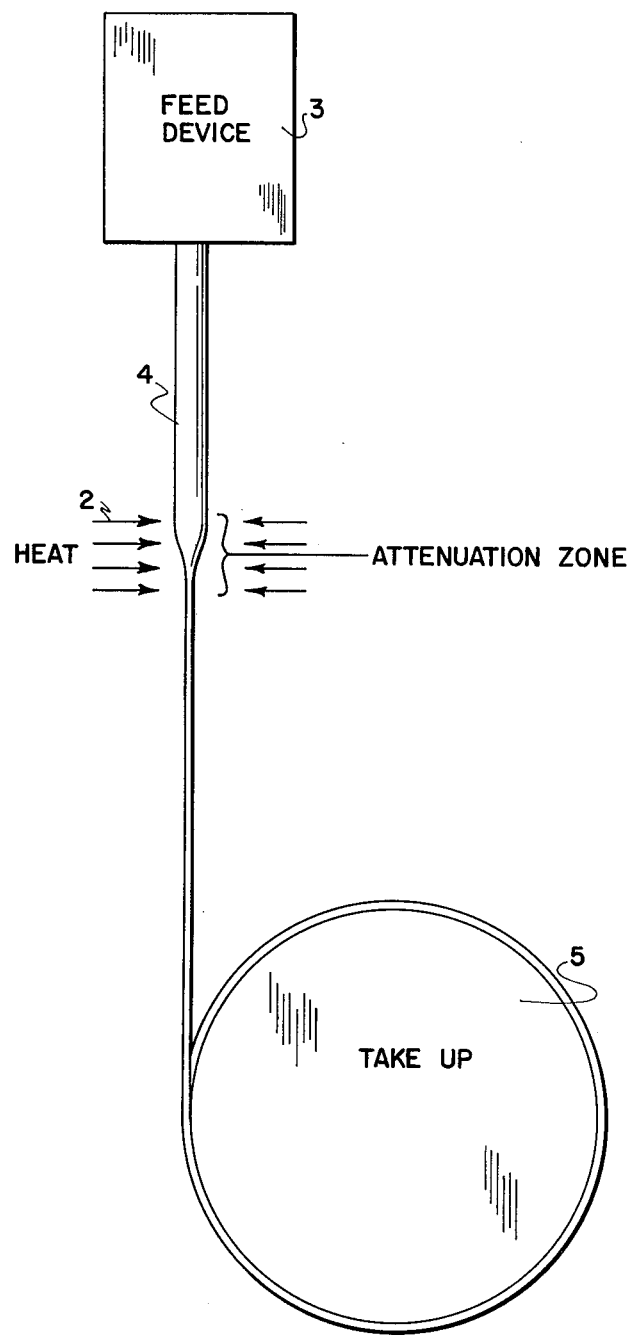

VITREOUS FIBER DRAWING PROCESS

PRIOR ART

The present invention constitutes an improvement upon the disclosures of U.S. Pat. Nos. 3,658,979 and Re27,123.

FIELD

This invention relates to a drawing process for producing vitreous oxide fibers having high moduli of elasticity and more particularly to such a process carried out within a narrow range of temperature and attenuation conditions to produce devitrification.

SUMMARY

The production of fibers by extruding inviscid melts of metals and metal oxides and metal oxide mixtures through small orifices into atmospheres which interact with the surfaces of the fibers to thereby provide sheaths which stabilize the fibers and prevent breakup of the fibers into droplets prior to their solidification is described in the aforesaid U.S. Pat. Nos. 3,658,979 and Re27,123.

Fibers produced by this method may be referred to as inviscid melt spun fibers, hereafter generally abbreviated as "IMS fibers."

Certain of such fibers have particularly desirable characteristics for some applications. Those fibers which are considered particularly desirable for present purposes are those spun from melts consisting essentially of one or more frefractory vitreous metal oxides wherein the temperature of the metal oxide or metal oxide mixture when molten is generally in excess of 1300° C.

Such IMS fibers, that is, IMS fibers prepared from such melts, have certain desirable properties. Particularly they have relatively high moduli of elasticity which makes them particularly suitable for use as reinforcement in conjunction with various synthetic resin systems to produce all sorts of desirable articles from bathtubs to boats to fishing rods as well as parts of airplanes, such as wings, flaps, cowlings and the like.

However, as desirable as such fibers of the prior art may be, it is considered that their moduli of elasticity are generally insufficient for many applications and accordingly it is a principal object of this invention to provide a process for markedly increasing the moduli of elasticity of such fibers, that is, IMS fibers prepared from inviscid molten vitreous metal oxides and mixtures thereof having molten temperatures in excess of 1300° C. and (as described in U.S. Pat. No. 3,658,979) having a Rayleigh parameter lying within the range of 1 to 50 and preferably within the range of 2 to 25, the Rayleigh parameter being a dimensionless quantity ($V\sqrt{\rho D/\gamma}$), which quantity is the square root of the well known Weber number and in which V is stream velocity, D is stream diameter and $\rho$ (rho) and $\gamma$ (gamma) are density and surface tension respectively of the melt.

Furthermore, the fibers to which the present invention are applicable are those fibers which are predominantly vitreous and in which silica is not present in a significant amount for reasons set forth below in greater detail.

The aforementioned patents describe the applicability of the processes of those patents to fibers of various metals and of many metal alloys but the present invention is unconcerned with such metal and metal alloy fibers as well as being unconcerned with melts comprising silica which contributes viscousness, that is, the presence of which tends to cause the mix to be viscous in somewhat direct proportion to the amount of silica present thereby obviating the needs for utilizing the processes of said patents in making possible the use of normal drawing processes used with viscid mixtures as opposed to the processes of said patents which are directed toward providing fibers from inviscid melts.

Generally speaking IMS fibers to which the invention is applicable as defined above (that is, IMS fibers formed from melts melting in excess of 1300° C. and comprising one or more vitreous metal oxides other than silica) are drawn as if they were viscous within an extremely limited temperature range at a temperature significantly below the normally attributed melting point of the mixture, that is, at a temperature below the normally determined solidus temperature of the mixture, generally at a temperature functionally describable as the lowest temperature empirically determinable at which drawing can be accomplished with a significantly short exposure to such drawing temperature for an absolute minimum period of time, generally no more than on the order of from 101 to a few tenths of a second and it is possible to desirably reduce the period during which the fiber is exposed to drawing temperature in the attenuation zone to as low as on the order of 1,000th of a second. Attenuation rates may vary widely and the degree of the attenuation may vary widely, the degree of the attenuation being defined as the ratio between initial and final diameter, that is, the diameter of the fiber after being treated in accordance with this invention. Alternatively, attenuation ratio may be defined as the ratio between a chosen incremental length of untreated IMS fiber and the length of such section after being treated in accordance with the invention. Attenuation ratios in accordance with the invention (using the first definition) may be as low as 2 or perhaps on the order of as great as 200.

Attenuation rates may of course vary in accordance with the attenuation rate desired and the rate at which energy is supplied in the form of heat to the attenuation zone.

Modulus increases of two fold have been obtained and modulus increases as great as four fold may be predicted. Specifically, increase of modulus from on the order of $10 \times 10^6$ psi to as high as $24 \times 10^6$ psi have been obtained in some instances and modulus increases from on the order of $10 \times 10^6$ to $40 \times 10^6$ are predicted. More specifically it is believed that we have discovered a process whereby such highly significant increases in modulus may be obtained with any one of a large number of fibers having widely varying compositions.

OBJECTS

Accordingly, it is an object of the invention to provide a method of treating an IMS fiber in order to increase its modulus of elasticity.

Another object is to provide fibers having moduli of elasticity which will have improved usefulness in composite systems with polymeric synthetic resinous materials.

Further objects will be apparent from the drawings and from the following detailed description in which it is intended to illustrate the applicability of the invention without thereby limiting its scope to less than that of all equivalents which will be apparent to one skilled in the art.

DRAWING

The drawing is a schematic view of the process of the invention.

DESCRIPTION

Glass fiber reinforced plastics are used widely wherever high strength to weight is important. Glasses, subjected to controlled, limited devitrification, are commonly employed for their combination of ceramic characteristics and high thermal shock resistance and strength.

Glass, which may be thought of as vitreous ceramic, in addition to being transparent ordinarily, is a strong, rock-like substance which can be conveniently worked into a variety of forms. Its one drawback, brittleness, has been circumvented largely by spinning it into fiber and employing the fiber as reinforcement in matrices of lower modulus of elasticity. The function of the lower modulus matrix is, in most composites, to decentralize stress concentrations and thereby preclude overloading of any one fiber by spreading the load at acceptable levels onto a sufficient number of other fibers.

In fibrous form, particularly when incorporated in composites, the strength of glass can be very high. The moduli of the common glasses, while high enough for many purposes, are too low to permit full utilization of their strengths. The utility of a structural member made of the composite disappears well before rupture because of the degree of flexure.

The moduli of the common glasses are dictated largely by the viscosity requirements of the predominant method of manufacture, namely continuous drawing from a viscous melt. The drawing method requires a melt viscosity in the neighborhood of $10^3$ poise. A sine qua non of the melt is, of course, that it does not crystallize at the temperature necessary to achieve the drawing viscosity.

In order to achieve this latter condition, it has been the practice currently and in the past to include a large fraction of silica ($SiO_2$) in the mixture of oxides constituting the glass. Other network formers such as boria or germonia have been used in specialized instances. The partially covalent character of the Si—O bond in silica fosters an increase in viscosity above the ten to 100 centipoise common with most metal oxides and mixtures at temperatures above their melting points.

Of the refractory oxides commonly used in glass compositions, silica has one of the lowest moduli, $10.5 \times 10^6$ psi. Accordingly, the large proportions of it normally required in glass compositions dictate a limit to the corresponding moduli. A few glass formulations have been developed having moduli as high as $15 \times 10^6$ psi; and $18 \times 10^6$ is generally regarded as about as high a modulus as can be obtained with silica based formulations.

Crystalline modifications of some of the more refractory of the common glass constituents have moduli in the $40 \times 10^6$ to $60 \times 10^6$ psi region, suggesting that glass moduli in excess of $18 \times 10^6$ psi might be attainable if the silica could be eliminated from the formulations. Removal of the silica from the composition greatly lowers the viscosity at the melting point. The reduction in voscosity is so great as to preclude formation of glass fiber by the conventional drawing process. A rapid quench is required in order to pass through the melting point without crystallizing or devitrifying.

An extrusion or spinning process such as the Inviscid Melt Spinning Process of Dunn et al. (U.S. Pat. No. 3,658,979) provides the proper rate of quench to avoid devitrification during cooling through the melting region. It side steps another problem associated with the low viscosity of the stream, namely Rayleigh breakup. It stabilizes the cylindrical form the nascent stream by rapid formation of a solid sheath until the melt congreals. The sheath may be formed of carbon by pyrolysis of a hydrocarbon, for example.

Ceramic fibers formed by this technique are indeed vitreous or glassy, despite the absence of silica in the formulation. The vitreous character is apparent from direct visual inspection as well as by the diffuse character of X-ray diffraction patterns. Densities are appreciably lower than would be anticipated from the crystalline densities of the component oxides.

Now we have determined that inviscid melt spun (IMS) fibers can be reworked or drawn to still finer fibers by techniques commonly used with glass, providing that the time within which the attenuation is carried out (and therefore the time during which the fiber is exposed to the necessary temperature) is very brief.

As with most glasses, these are thermodynamically unstable. Ultimately, they will devitrify, i.e., rearrange into denser, stiffer, potentially stronger, crystalline forms. They will do so rapidly just below the melting point, more rapidly still then more slowly as the temperature is lowered further below the melting point.

The strength of a glass fiber can either increase or decrease markedly upon devitrification. Which it does and to what degree is determined by the characteristics of the devitrification. Extensive localized devitrification can cause loss of virtually all strength. Uniformity of degree and of dispersion of crystallinity, on the other hand, are accompaniments of increased strength.

As is well known, the development of a controlled, uniform distribution of crystallites in a glass, upon which strength depends, requires mutual balance among several parameters: the concentration of nuclei, the degree of supersaturation, the mobility, the time during which the latter two are maintained and the concentrations of the species to be crystallized. In goes without saying that the distribution of nuclei and the composition in general must be relatively uniform to start with.

In the drawing of an IMS or any other vitreous fiber or rod, the ratio of tensile stress to attenuation rate is fixed by the viscosity, which in turn is determined by the temperature at which drawing is carried out. Thus, the ultimate tensile strength of the drawn fiber, largely a function of composition, is one factor setting a lower limit on fiber diameter, while temperature constitutes an additional parameter by means of which the degree of attenuation may be controlled. Residence time in the hot zone is the final variable controlling the degree of attenuation; it is usually directly controlled in turn by rate of feed of glass, e.g., IMS fiber to the furnace, and by the length of the hot zone therein.

The range of viscosities serviceable in drawing from an IMS or other glass fiber or rod covers only about an order of magnitude in the region of $10^3$ poise. Since viscosity is an exponential function of temperature, this corresponds to only a few tens of degrees Celcius. The control of any limited crystallization carried out concurrently with the drawing of IMS fibers must, therefore, respect these temperature limits. In other words, the control of degree of supersaturation and mobility are circumscribed accordingly. Thus, it is problematical whether there is sufficient leeway in nucleation, composition and exposure time to accommodate the above limitation on mobility and degree of supersaturation in order to achieve uniform, controlled crystallization during drawing of IMS fibers.

Nevertheless, we discovered that conditions for drawing IMS fibers to finer diameters can be found which at the same time, will serve to produce limited, uniformly dispersed crystallization with an attendent increase in modulus of elasticity. A very simple apparatus was employed. As shown in the Figure, it consisted of a vertically oriented furnace to apply heat as indicated at 2, a motorized feed mechanism 3 to introduce the IMS fiber 4 into the furnace, and take-up means 5 which provided drawing tension.

EXAMPLE 1

Heating means consisted of a 0.59 cm. long helix of 0.0081 diam Pt. wire. The helix was 0.159 cm. in diameter which was surrounded by heat shielding, with axial openings for the fiber above and below. Temperatures were read on the Pt. wire and the interior furnace wall by optical pyrometer. Take-up means was conventional.

An IMS fiber was attached to the feed divice, fed through the furnace, and attached to the take-up means. The feeding device was then started and the furnace temperature rapidly raised to a predetermined voltage and amperage to achieve drawing. The drawing was carried out with the IMS fiber oriented vertically but could be carried out horizontally instead of vertically or at any other angle which might be convenient.

Several lengths of fiber were drawn from an IMS fiber spun from a melt prepared from reagent grades of alumina and calcia in weight proportions of 53.5% and 46.5% respectively. The IMS fibers were fed into the furnace at a rate of 0.25 cm/sec. From measurements of furnace coil and wall temperature, drawing temperature of the IMS fiber was estimated to lie between 1200° and 1300° C., well below the melting point of the ceramic from which the IMS fibers were prepared. The results which were obtained are shown in Table 1.

fiber broke. The cup, water and bitter end of the broken fiber weighed 3.957 gm. The diameter of the fiber at the break was 0.00081 cm (8.1 microns) corresponding to an ultimate tensile strength of $109 \times 10^3$ psi, comparable to that of the IMS fiber itself. The break did not occur at the point of attachment of the fiber either to the cup or to the support.

The effect of composition can be seen in attempts to fiberize $Al_2O_3$CaO 64.5/35.5 IMS fibers in the same equipment. These were unsuccessful apparently due to excessive devitrification because of limitations of the equipment. Even when the maximum feed rate was employed, only a very short length could be drawn before breakage occurred. Whereas the 53.5% $Al_2O_3$ mixture was a eutectic, the 64.5% $Al_2O_3$ mixture corresponds to the compound $Al_2O_3 \times$ CaO. The components of the crystal lattice are undiluted with other species and the lattice may tend thereby to form more readily. We may employ a furnace with a hot zone of 0.20 cm., $\frac{1}{3}$ the length of the one described above and achieve drawn fiber or we may utilize modified equipment capable of 0.75 cm/sec, three times the feed-rate used in the previous example, and attain the same result.

For this and perhaps other reasons, still shorter furnaces and/or higher feed rates are required to draw fiber from $Al_2O_3$/CaO 80.7/19.3 IMS fibers, and even more so in the case of pure $Al_2O_3$ IMS fibers.

We have found that moduli of the $Al_2O_3$ IMS fibers increase with $Al_2O_3$ content in approximately linear fashion. The data indicate that this increase is according to the expression:

Modulus of Elasticity (psi) = 0.396X − 10.0 where X = %$Al_2O_3$. Drawn fibers show significant increases in modulus over and above their respective parent IMS fibers.

No nucleating agent was deliberately placed in the melts from which fibers were in turn spun and drawn. Some nucleation could occur as a result of Pt vapor from the furnace heater coil. However, nucleation from this source would be localized at the surface and would probably provide lower strength than is observed. A more uniform distribution, more consistent with mea- Table 1

| Modulus Improvement Ratio | Diameter of IMS fiber, microns | Average modulus of elasticity of IMS fiber, psi × 10⁶ | Diameter of Drawn Fiber | | | Attenuation Ratio, initial dia./ final dia. | Modulus of elasticity of IMS fiber psi × 10⁶ | | | t-test Value | | Confidence Level, % |
|---|---|---|---|---|---|---|---|---|---|---|---|---|
| | | | Max. | Min. | Ave., Weighted | | Max. | Min. | Ave. | t | Degrees of freedom | |
| 1.97 | 221 | 12.1±.4 | 43.2 | 37.8 | 41 | 5.4 | 25.2 | 22.3 | 23.8 ±1.4 | 39.8 | 9 | >99.9 |
| 1.93 | 416 | 10.3±.2 | 16.2 | 13.5 | 15.3 | 27.2 | 23.3 | 17.5 | 19.9 ±2.2 | 32.6 | 12 | >99.9 |
| 1.70 | 416 | 10.3±.2 | 27.0 | 21.6 | 23.4 | 17.8 | 21.1 | 15.8 | 17.5 ±2.1 | — | — | >99.9 |

Modulus of elasticity was determined using the vibrating reed technique and employing the fundamental, and 1st through 3rd harmonics.

As may be seen, a very significant increase in modulus was obtained.

Another sample of fiber drawn from the same IMS stock was subjected to X-ray diffraction. The pattern showed evidence of 10±5% crystallinity, the crystallites being in the region of $10^{-3}$ to $10^{-5}$ cm. in diameter. The pattern of the parent IMS fiber was amorphous.

Still another sample of drawn fiber was hung vertically and an aluminum cup suspended from its lower end just above the desk top. Water was slowly and carefully added from a hyperdermic needle until the sured strength, might arise in association with the shearing action inherent in the drawing or attenuating process or from dispersed tungsten from the tungsten crucible from which the IMS fibers were spun.

I may prepare vitreous IMS ceramic fibers, and from these draw controlled, devitrified fibers from any metal oxide other than that of silica or another network former (e.g., boria or germania), or any mixture of two or more of these oxides. Trace or minor amounts of silica or another network former are often difficult to exclude and as much as 1% of same will not interfere and may be present. Table 2 is a list of high melting metal oxides amenable to this process whose high moduli would be of interest to incorporate into fiber form.

Frequently the moduli of crystalline metal oxides parallel their melting points. The present method applied to eutectic and other mixtures represents a way to achieve some of the stiffness of a high melting oxide in fiber form through operations carried out at lower temperatures. Table 3 lists a number of eutectics which besides lower melting point, offer some hindrance to the crystallization process and thereby mitigate the requirement of brevity of residence time in the heat zone during drawing. However, compositions which are not eutectics but have proportions of oxides such that they are not far from eutectics may be most suitable.

Whereas pure compositions and eutectics have precise melting points, other compositions in accordance with the invention have melting ranges. The top of each melting range is the liquidus point and the bottom of each melting range is the solidus point of the composition. When the liquidus and solidus points coincide the composition is said to have a sharp melting point. For purposes of defining the drawing conditions of the present invention, melting point and solidus point may be considered equivalent.

TABLE 2

MELTING POINT AND MODULUS OF ELASTICITY OF SOME CRYSTALLINE METAL OXIDES

| Oxide | Melting Point (° C) | Modulus of Elasticity (psi · $10^6$) | Modulus of Elasticity (kg/cm$^2$ · $10^6$) |
|---|---|---|---|
| $Al_2O_3$ | 2072 | 73.9 | 5.2 |
| BaO | 1918 | | |
| BeO | 2570 | 44.1 | 3.1 |
| $Cr_2O_3$ | App. 2320 | | |
| $CeO_2$ | App. 2800 | 24.2 | 1.7 |
| $Fe_3O_4$ | 1594 | | |
| $HfO_2$ | 2900 | | |
| MgO | 2852 | 12.4 | .88 |
| $SiO_2$ | 1723 | 10.5 | .74 |
| $ThO_2$ | 3220 | *34.6 | *2.43 |
| $TiO_2$ | App. 1850 | | |
| $UO_2$ | 2878 | | |
| $Y_2O_3$ | 2410 | | |
| ZnO | 1969 | | |
| $ZrO_2$ | App. 2700 | 24.5 | 1.72 |

*With 0.5% Ca present

TABLE 3

MELTING POINTS OF SOME METAL OXIDE EUTECTICS

| Eutectic Compositions (w/o) | Melting Point (° C) |
|---|---|
| BeO - CaO<br>23.0  77.0 | 1360°±5° |
| BeO - MgO<br>47.2  52.8 | 1855 |
| BeO - $Al_2O_3$<br>25  75 | 1835 |
| 15  85 | 1850 |
| 7  93 | 1890 |
| BeO - $La_2O_3$<br>12  88 | 1371 |
| BeO - $Y_2O_3$<br>17.1  82.9 | 1580 |
| BeO - $Yb_2O_3$<br>10.5  89.5 | 1720 |
| BeO - $TiO_2$<br>15  85 | 1670 |
| BeO - $UO_2$<br>14.1  85.9 | 2150 |
| BeO - $ZrO_2$<br>29.2  70.8 | 2145 |
| CaO - $ZrO_2$<br>24.8  75.2 | 2280 |

TABLE 3-continued

MELTING POINTS OF SOME METAL OXIDE EUTECTICS

| Eutectic Compositions (w/o) | Melting Point (° C) |
|---|---|
| MgO - $Al_2O_3$<br>2.0  98.0 | 1920 |
| MgO - $ZrO_2$<br>25  75 | 2070 |
| $Al_2O_3$ - $CeO_2$<br>47.0  53.0 | 1800 |
| $Al_2O_3$ - $Al_4C_3$<br>86.4  13.6 | 1840 |
| BeO - CaO - $ZrO_2$<br>4.4  23.1  72.5 | 2035 |
| BeO - MgO - $ThO_2$<br>34  29  37 | 1797 |
| BeO - MgO - $ZrO_2$<br>19  25  56 | 1669 |
| BeO - $Al_2O_3$ - ThO<br>19  41  40 | 1795 |
| BeO - $Al_2O_3$ - $SiO_2$<br>16  64  20 | 1700 |
| BeO - $Al_2O_3$ - $TiO_2$<br>16.5  32.5  51 | 1572 |
| $Al_2O_3$ - $Cr_2O_3$ - MgO<br>49  10  41 | 1950 |

It will be apparent to those skilled in the art that equivalents may be utilized.

Accordingly, the present invention may be embodied in other specific forms without departing from the spirit or essential attributes thereof and accordingly, reference should be made to the appended claims rather than to the foregoing specification, as indicating the scope of the invention.

It is claimed:

1. The process of drawing an inviscid melt spun fiber having a composition consisting essentially of at least one nonnetwork forming refractory metal oxide, said composition characterized by melting at a relatively high temperature so that it has a solidus point or melting point in excess of 1300° C., said process characterized by drawing at a temperature significantly below said temperature at which said composition melts so that all temperatures in the heated zone within which the fiber undergoes attenuation are substantially below the said solidus point or melting point of said composition, so as to produce controlled devitrification.

2. The process of claim 1 wherein said composition is further characterized by being a eutectic mixture of said oxides.

3. The process of claim 2 wherein said eutectic mixture is about 53.5 weight percent alumina and 46.5 weight percent calcia.

4. The process of drawing an inviscid melt spun fiber having a composition selected from the group consisting of metal oxides and mixtures thereof comprising less than about 1% $SiO_2$ or other network former, said composition characterized by melting at a relatively high temperature so that it has a solidus point or melting point in excess of 1300° C., said process characterized by drawing at a temperature significantly below said temperature at which said composition melts so that all temperatures in the heated zone within which the fiber undergoes attenuation are substantially below the said solidus point or melting point of said composition, so as to produce controlled devitrification.

5. The process of claim 4 wherein said composition is further characterized by being a eutectic mixture of said oxides.

6. The process of claim 5 wherein said eutectic mixture is about 53.5% weight percent alumina and 46.5 weight percent calcia.

* * * * *